(12) United States Patent
Demura et al.

(10) Patent No.: US 7,267,213 B2
(45) Date of Patent: Sep. 11, 2007

(54) ONE-WAY CLUTCH

(75) Inventors: Yoshihiro Demura, Iwata (JP); Makoto Yasui, Iwata (JP); Masao Komuro, Iwata (JP)

(73) Assignee: NTT Corporation, Osaka (JP)

( * ) Notice: Subject to any disclaimer, the term of this patent is extended or adjusted under 35 U.S.C. 154(b) by 155 days.

(21) Appl. No.: 11/073,671

(22) Filed: Mar. 8, 2005

(65) Prior Publication Data

US 2005/0199463 A1  Sep. 15, 2005

(30) Foreign Application Priority Data

Mar. 9, 2004 (JP) .............................. 2004-065688
Nov. 18, 2004 (JP) .............................. 2004-334585

(51) Int. Cl.
*F16D 41/07* (2006.01)
*F16D 51/00* (2006.01)
(52) U.S. Cl. ............... 192/45.1; 192/41 R; 192/110 B; 192/113.32; 188/82.8
(58) Field of Classification Search .................. None
See application file for complete search history.

(56) References Cited

U.S. PATENT DOCUMENTS

| | | | | |
|---|---|---|---|---|
| 157,997 A * | 12/1874 | Krum | ........................ | 192/41 R |
| 1,992,527 A * | 2/1935 | Garratt | ........................ | 192/41 R |
| 2,245,467 A * | 6/1941 | De Place | ..................... | 74/650 |
| 2,536,574 A * | 1/1951 | Scholfield et al. | .......... | 188/82.8 |
| 3,021,925 A * | 2/1962 | Osborne | ..................... | 188/82.8 |
| 3,064,777 A | 11/1962 | Boedigheimer et al. | | |
| 3,202,250 A * | 8/1965 | Fulton | ........................ | 192/45.1 |
| 3,368,834 A * | 2/1968 | Stratienko | ................... | 192/45.1 |
| 3,877,556 A * | 4/1975 | Brownscombe | ............ | 192/45.1 |
| 4,825,990 A * | 5/1989 | Sassi | ........................ | 192/41 R |
| 5,415,258 A | 5/1995 | Numata | | |
| 6,793,056 B2 * | 9/2004 | Takada et al. | ................. | 192/45 |
| 2003/0024785 A1 | 2/2003 | Takada et al. | | |

FOREIGN PATENT DOCUMENTS

| | | | |
|---|---|---|---|
| GB | 753388 | | 7/1956 |
| JP | 4-244644 A | * | 9/1992 |
| JP | 5-332409 | | 12/1993 |
| JP | 2904660 | | 3/1999 |

* cited by examiner

*Primary Examiner*—Rodney H. Bonck
(74) *Attorney, Agent, or Firm*—Wenderoth, Lind & Ponack, L.L.P.

(57) ABSTRACT

A one-way clutch is proposed which is low in surface pressures and durable. It includes an inner ring having a cylindrical outer surface, and an outer ring having a cylindrical inner surface defining a wedge-shaped space in cooperation with the cylindrical outer surface of the inner ring. A ring-shaped wedge member is disposed in the wedge-shaped space. The wedge member is formed with a cylindrical outer surface and a cylindrical inner surface having a center of curvature that is radially offset from the center of curvature of the cylindrical outer surface of the wedge member. A resilient member is provided between the inner ring and the wedge member to bias the wedge member in a direction to be wedged into the narrow portion of the wedge-shaped space. When the inner ring is rotated in one direction, the wedge member will be brought into wedging engagement with the cylindrical surfaces of the inner and outer rings. Torque is thus transferred from the inner ring to the outer ring.

13 Claims, 7 Drawing Sheets

ONE-WAY CLUTCH

BACKGROUND OF THE INVENTION

This invention relates to a one-way clutch, i.e. a clutch that transmits only torque in one direction from its input member to its output member.

There are a variety of one-way clutches, including those having a large torque capacity, which are used in automobiles, power tools, etc., and those having a smaller torque capacity, which are used e.g. in office machines such as copiers and PC's, and cameras.

Among such conventional one-way clutches, those of the type as disclosed in JP patent 2904660 are by far the most popular, irrespective of their torque capacity. This type of one-way clutch comprises inner and outer rings, and a plurality of engaging elements disposed between the inner and outer rings and retained by a retainer, also disposed between the inner and outer rings. Resilient members bias the engaging elements in one circumferential direction to keep the engaging elements in engagement with both of the inner and outer rings when the inner and outer rings rotate relative to each other in one direction. The engaging elements are typically rollers or sprags.

JP patent publication 5-332409 discloses another type of one-way clutch, which comprises a cylindrical member having a cylindrical inner surface, a shaft inserted in the cylindrical member and having a plurality of cam surfaces on its outer periphery, opposite the cylindrical inner surface of the cylindrical member, and friction members having inner and outer arcuate surfaces and each received in a wedge-shaped space defined between the cylindrical inner surface of the cylindrical member and one of the cam surfaces. Each friction member is biased toward the narrower end of the wedge-shaped space by a resilient member so that when the shaft and the cylindrical member rotate relative to each other in one direction, the inner and outer arcuate surfaces thereof are pressed hard against the cylindrical inner surface of the cylindrical member and the cam surface.

The first-mentioned one-way clutch has a problem in that the surface pressure is high when the engaging elements engage the inner and outer rings because the engaging elements are brought into line contact with the inner and outer rings. Thus, when high torque is transmitted between the inner and outer rings, the contact surfaces tend to suffer impressions, peeling and/or cracks. This shortens the life of the clutch.

One way to prevent this problem would be to increase the number of engaging elements used and/or increase their size. But this solution necessarily results in increased size, weight and cost of the entire clutch. Thus, this solution is not always practical or advantageous.

The second-mentioned one-way clutch is free of this problem because the inner and outer arcuate surfaces of the friction members are brought into surface contact, instead of line contact, with the cylindrical inner surface of the cylindrical member and a cam surface. But this clutch has a problem in that the shaft and the cylindrical member cannot be reliably locked together due to a slip that may develop between the inner and outer arcuate surfaces of the friction members and the inner cylindrical surface of the cylindrical member and the cam surfaces. Also, because the inner and outer arcuate surfaces of the friction members have three-dimensional shapes, their dimensions have to be measured using a three-coordinate measuring machine, which is extremely troublesome.

An object of the invention is to provide a one-way clutch which is durable, compact in size, light in weight, less costly, and easy in quality control, by reducing surface pressures when engaged.

SUMMARY OF THE INVENTION

According to this invention, a one-way clutch comprises an inner ring having a first cylindrical surface on an outer periphery thereof, the first cylindrical surface having a first center of curvature, an outer ring having a second cylindrical surface on an inner periphery thereof so as to radially oppose the first cylindrical surface, the second cylindrical surface having a second center of curvature that is offset from the first center of curvature, the first and second cylindrical surfaces defining a wedge-shaped space therebetween. The one-way clutch also comprises a wedge member disposed in the wedge-shaped space and having a third cylindrical surface on an inner periphery thereof so as to radially oppose the first cylindrical surface, the third cylindrical surface having a third center of curvature, and a fourth cylindrical surface on an outer periphery thereof so as to radially oppose the second cylindrical surface, the fourth cylindrical surface having a fourth center of curvature that is radially offset from the third center of curvature, whereby the wedge member has a circumferentially changing radial width. The one-way clutch also comprises a resilient member biasing the wedge member in a direction to bring the third and fourth cylindrical surfaces into wedging engagement with the first and second cylindrical surfaces, respectively.

When the inner ring is rotated relative to the outer ring, the narrow portion of the wedge-shaped space will move circumferentially relative to the inner ring. When the inner ring is rotated in such a direction that the narrow portion of the wedge-shaped space approaches the wide portion of the wedge member, the abovementioned third and fourth cylindrical surfaces will be brought into wedging engagement with the first and second cylindrical surfaces, respectively, so that torque is now transferred from the inner ring to the outer ring.

When the inner ring is rotated in the opposite direction to the above, the first and second cylindrical surfaces will disengage from the third and fourth cylindrical surfaces, allowing the inner ring to idle.

The wedge-shaped space may be formed such that the center of rotation of the inner ring is offset from the first center of curvature and coincides with the second center of curvature. In this case, the inner ring may have an outer diameter smaller than the inner diameter of the wedge member. Alternatively, the inner member may be disposed such that its center of rotation coincides with the first center of curvature and is offset from the second center of curvature.

In another aspect of the invention, a one-way clutch comprises an inner ring having a center of rotation and formed with a pair of diametrically opposed, partial cylindrical surfaces on an outer periphery thereof, the partial cylindrical surfaces having first centers of curvature that are offset from the center of rotation, an outer ring provided around the partial cylindrical surfaces and having a cylindrical surface on an inner periphery thereof so as to radially oppose the partial cylindrical surfaces, the cylindrical surface having a second center of curvature that coincides with the center of rotation, each of the first partial cylindrical surfaces and the cylindrical surface defining a wedge-shaped space therebetween. The one-way clutch also comprises a pair of arcuate wedge members disposed in the respective wedge-shaped spaces, and resilient members biasing the respective wedge members in directions to wedge the wedge members into between the cylindrical surface of the outer ring and the respective partial cylindrical surfaces.

In order to reduce the cost of the one-way clutch, its inner ring, outer ring, and/or wedge member or wedge members may be formed by pressing.

By forming the inner ring, outer ring, and/or wedge member or wedge members from sintered material or a synthetic resin, it is possible to reduce the weight and cost of the one-way clutch and to minimize seizure during idling because such material has self-lubricity.

In order to minimize torque input necessary to disengage the clutch, a rolling bearing is preferably mounted between the opposed surfaces of the input shaft to which the inner ring is fixed and the outer ring, or between opposed surfaces of the input shaft and the housing supporting the outer ring.

Such a bearing may be a deep groove ball bearing or a needle bearing.

Since the inner and outer cylindrical surfaces of the wedge member or members are brought into wedging engagement with the inner ring outer cylindrical surface or surfaces and the outer ring inner surface, surface pressures are kept low. This improves durability of the one-way clutch.

The engaging surfaces formed on the wedge member or members and the inner and outer rings are simple cylindrical surfaces, these members can be measured easily and their quality control is easy too, which reduces the maintenance cost.

Further, since surface pressures can be kept low, it is possible to reduce the thicknesses of the inner and outer rings and the wedge member or members. Thus, these members can be formed by pressing or made of a sintered material or a synthetic resin. This in turn makes it possible to reduce the weight and cost of the one-way clutch.

By mounting a rolling bearing between the opposed surfaces of the input shaft and the outer ring or between the opposed surfaces of the input shaft and the housing supporting the outer ring, the input shaft encounters less rotational resistance than when a slide bearing is mounted. This reduces the torque input necessary to disengage the clutch.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
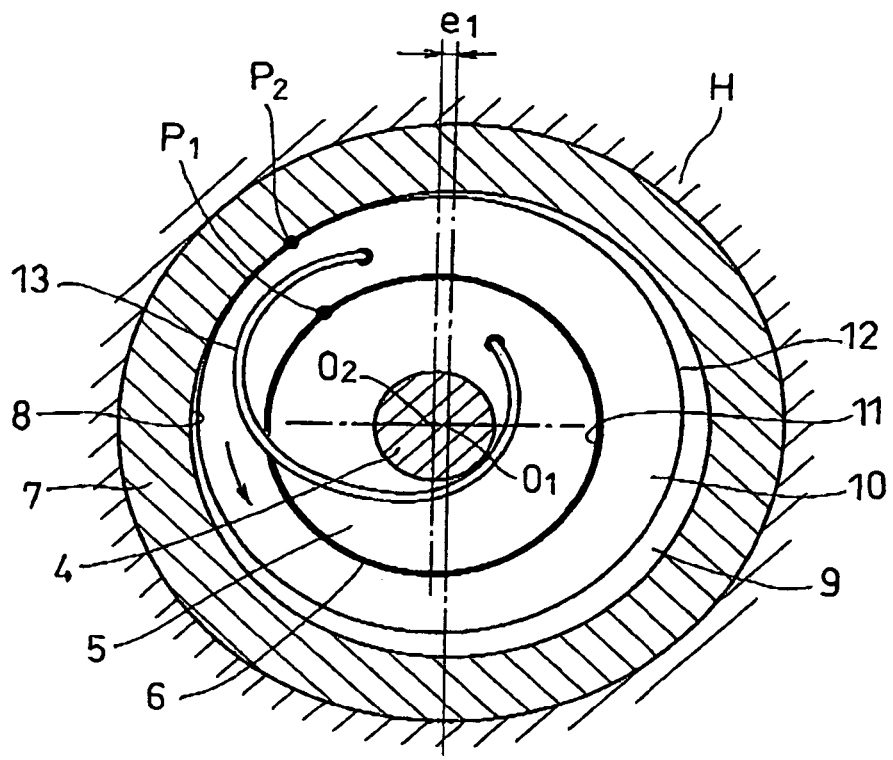
FIG. 1 is a front view in vertical section of a one-way clutch according to a first embodiment of the present invention.

Now referring to the drawings, FIGS. 1-5 show the one-way clutch of the first embodiment of the invention. It includes an input shaft 1 rotatably supported by a bearing 2 mounted on the radially inner surface of a housing H. At one end thereof, the input shaft 1 has an end portion having a cylindrical guide surface 3 whose center coincides with the axis (center of rotation O1) of the input shaft 1.

An eccentric shaft 4 protrudes from the end portion of the input shaft 1. The eccentric shaft 4 has a center O2 that is offset from the center of rotation O1 of the input shaft 1 by a distance e1. An inner ring 5 is pressed on the eccentric shaft 4.

The inner ring 5 has a radially outer cylindrical surface 6 whose center coincides with the center O2 of the eccentric shaft 4.

The one-way clutch further includes an outer ring 7 disposed around the inner ring 5 and pressed into the housing H. The outer ring 7 has an inner cylindrical surface 8 that is in sliding contact with the guide surface 3 of the input shaft 1 so that the outer ring 7 is rotatable relative to the input shaft 1 while kept coaxial with the input shaft 1. Since the outer ring 7 is coaxial with the input shaft 1, an annular wedge-shaped space 9 is defined between the cylindrical surface 8 of the outer ring 7 and the cylindrical surface 6 of the inner ring 5 such that its widest and narrowest portions are arranged on the line connecting the centers O1 and O2 of the cylindrical surfaces 6 and 8.

A ring-shaped wedge member 10 is disposed between the inner and outer rings 5 and 7. The wedge member 10 has radially inner and outer cylindrical surfaces 11 and 12. The wedge member 10 is rotatable relative to the inner ring 5 with its inner cylindrical surface 11 in sliding contact with the cylindrical surface 6 of the inner ring 5.

Figure 3:
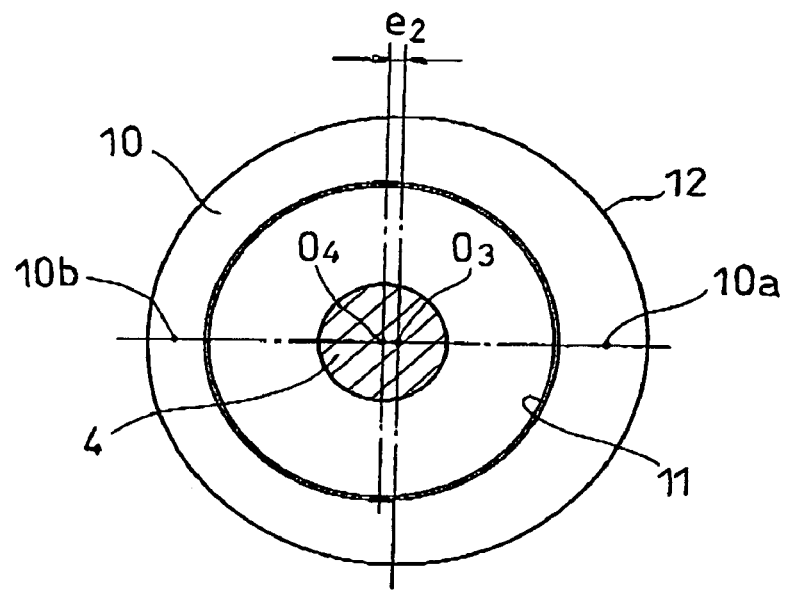
FIG. 3 is a front view of the same, showing the input shaft, inner ring and wedge member only.

Referring to FIG. 3, the outer cylindrical surface 12 of the wedge member 10 has its center O3 offset from the center O4 of the inner cylindrical surface 11 of the wedge member 10 by a distance e2. Thus, the wedge member 10 has radially widest and narrowest portions 10a and 10b that are arranged diametrically opposite to each other such that its radial width gradually increases from its narrowest portion toward its widest portion. The widest portion 10a is wider than the widest portion of the wedge-shaped space 9.

Figure 2:
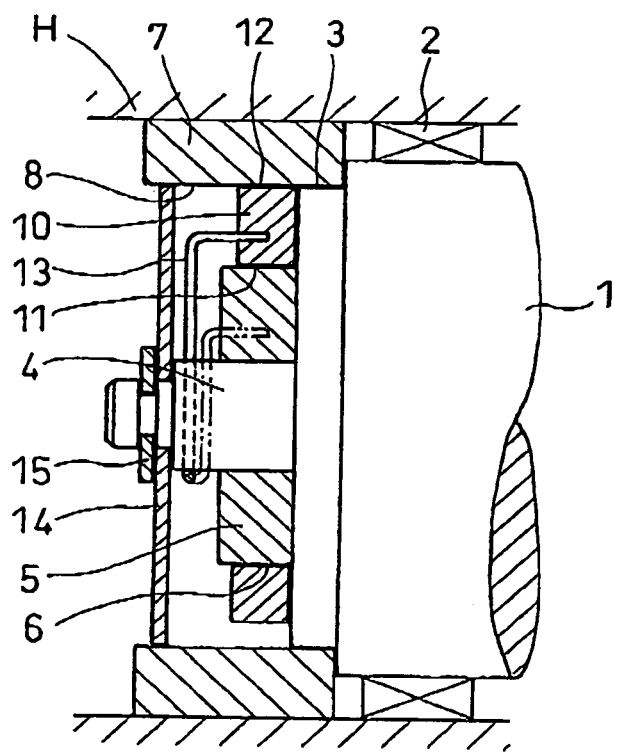
FIG. 2 is a vertical sectional side view of the same.

As shown in FIGS. 1 and 2, the inner ring 5 and the wedge member 10 are connected by a resilient member 13, which is shown as a spring in the shape of the letter C. It has one end thereof engaged in the inner ring 5 and the other end engaged in the wedge member 10. The resilient member 13 biases the wedge member 10 in such a direction that the widest portion 10a approaches the narrowest portion of the wedge-shaped space 9, thereby keeping portions of the inner and outer cylindrical surfaces 11 and 12 of the wedge member 10 always in contact with the inner ring cylindrical surface 6 and the outer ring cylindrical surface 8, at points P1 and P2 in FIG. 4. The points P1 and P2 are arranged such that the angles θ1 and θ2 between the line passing both points P1 and P2 and the normal lines passing the respective points P1 and P2 are equal to the wedge angles of the wedge member 10 at points P1 and P2, respectively (ordinarily 1 to 5 degrees).

As shown in FIG. 2, a cover 14 is mounted to the eccentric shaft 4 near its free end to close the open end of the outer ring 7. A snap ring 15 prevents the cover 14 from coming off the eccentric shaft 4.

FIG. 1 shows a state in which the input shaft 1 is stationary with the resilient member 13 biasing the wedge member 10 in the direction of the arrow in FIG. 1, thereby keeping parts of the inner and outer cylindrical surfaces 11 and 12 in contact with the inner ring cylindrical surface 6 and the outer ring cylindrical surface 8, respectively.

Figure 4:
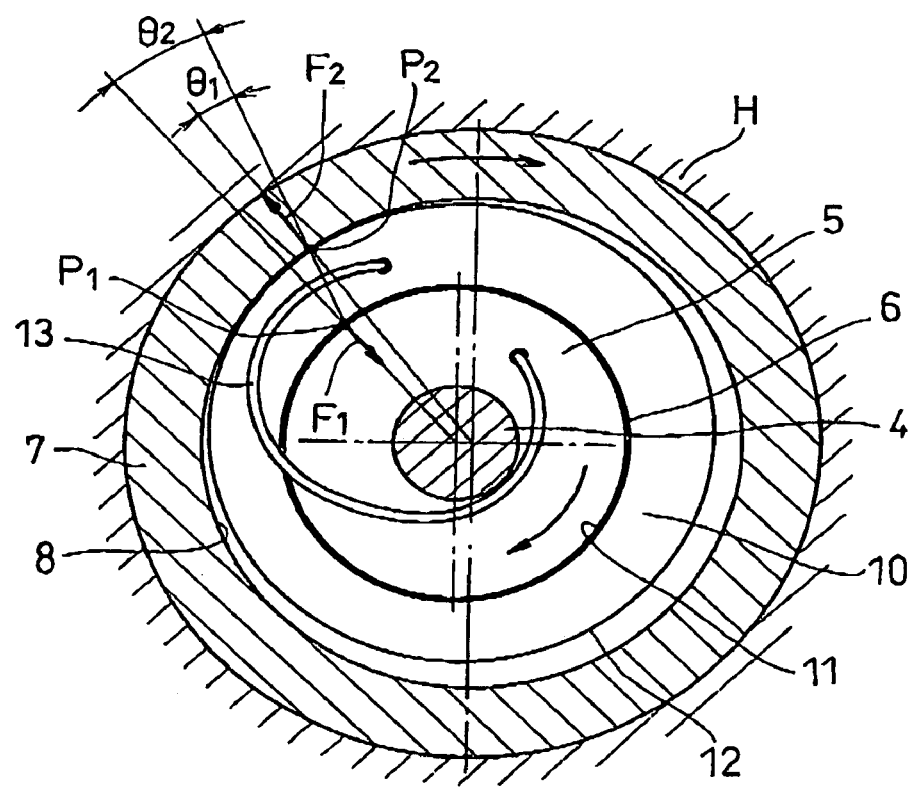
FIG. 4 is a sectional front view of the one-way clutch of FIG. 1, showing how torque is transferred.

In this state, when the input shaft 1 begins to rotate in the direction of the arrow in FIG. 4, the inner ring 5 will rotate about the center O1 of the input shaft 1, which is offset from its own center O2.

When the inner ring 5 rotates in this direction, the wedge member 10, which is being biased by the resilient member 13 in the opposite direction, will rotate only for a short distance relative to the inner ring 5 before getting wedged into the narrow portion of the wedge-shaped space 9. While the wedge member 10 is rotating for this short distance, the surface pressures between the cylindrical inner and outer surfaces 11 and 12 of the wedge member 10 and the inner ring cylindrical surface 6 and the outer ring cylindrical surface 8 will increase at points P1 and P2 due to forces in normal directions at points P1 and P2. The wedge member 10 is thus slightly deformed elastically by the time it is wedged into the narrow portion of the space 9. Once the wedge member 10 wedges into the narrow portion of the space 9, it engages both the inner ring cylindrical surface 6 and the outer ring cylindrical surface 8, thus transferring torque from the input shaft 1 to the outer ring 7.

Figure 5:
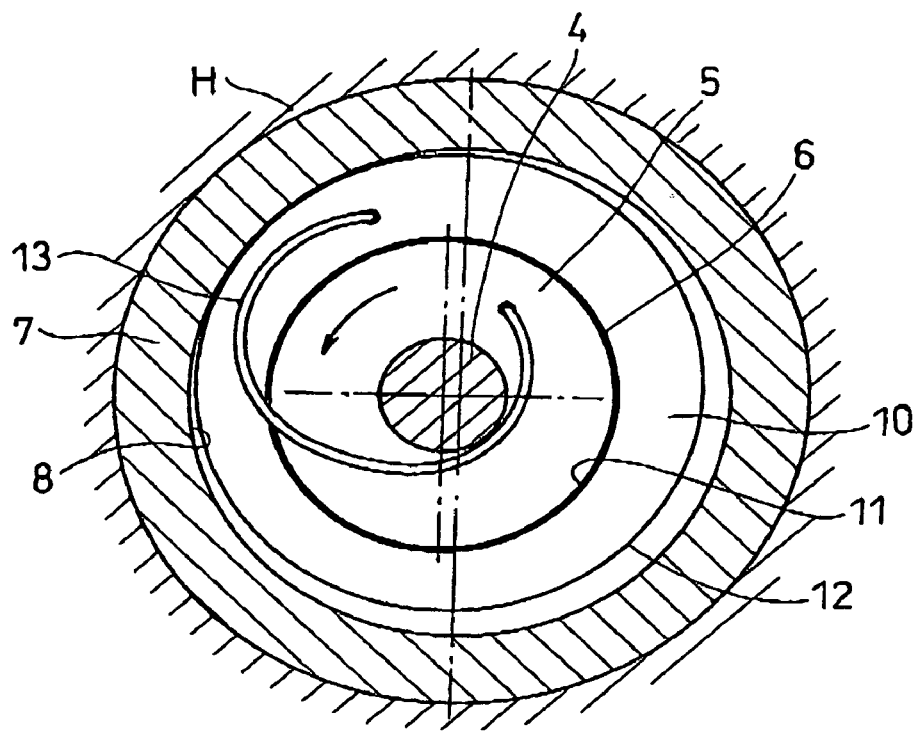
FIG. 5 is a similar view showing how the clutch is disengaged.

On the other hand, if the input shaft 1 rotates in the direction of the arrow in FIG. 5, the inner ring 5 will rotate eccentrically in the same direction as the input shaft 1. This causes the wedge member 10 to be positioned in the wedge-shaped space 9 such that its point P2 is in a wider portion of the space 9 and thus is disengaged from the outer ring 7. Once the wedge member 10 disengages from the outer ring 7, the wedge member 10 slides on the outer ring cylindrical surface 8 biased by the resilient member 13. The input shaft 1 thus idles.

In this arrangement, as fully explained above, when the input shaft 1 rotates in the direction of the arrow in FIG. 4, the inner and outer cylindrical surfaces 11 and 12 of the wedge member 10 instantly engage the inner ring cylindrical surface 6 and the outer ring cylindrical surface 8. Also, the surfaces 11 and 12 are brought into surface contact with the surfaces 6 and 8. Because of surface pressure, the surface pressures are kept low, so that the one-way clutch of this embodiment is durable.

Figure 6:
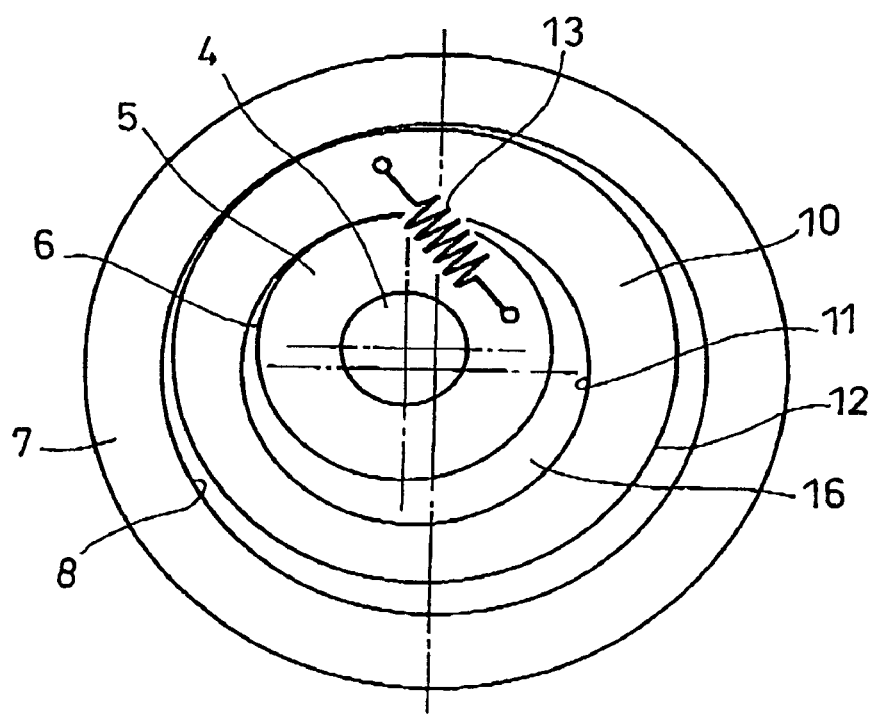
FIGS. 6 to 8 are vertical sectional front views of second to fourth embodiments, respectively.

FIG. 6 shows the second embodiment, which differs from the first embodiment in that the inner ring 5 has an outer diameter that is smaller than the inner diameter of the wedge member 10 to define a crescent space 16 between the inner ring 5 and the wedge member 10, and that the resilient member 13 is a tensile coil spring.

Other elements are identical to corresponding elements of the first embodiment. Thus, they are denoted by identical numerals and their description is omitted.

The crescent space 16 makes it easier for the wedge member 10 to rotate relative to the inner and outer rings, and thus to wedge into the wedge-shaped space 9.

Figure 7:
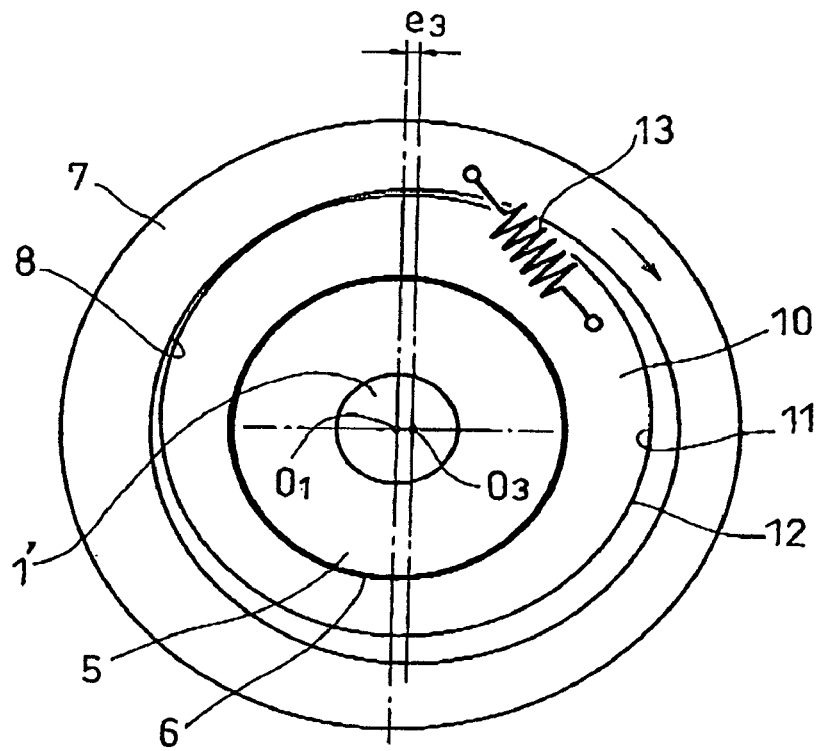

FIG. 7 shows the third embodiment, in which the inner ring 5 is mounted on an output shaft 1' so that the inner ring 5 and the output shaft 1' have a common center O1 and are rotatable about this common center. The inner cylindrical surface 8 of the outer ring 7 has its center O3 offset from the center O1 by a distance e3. The resilient member 13 of the third embodiment is a tensile coil spring connecting the wedge member 10 to the outer ring 7 to bias the wedge member 10 so as to be wedged into between the inner ring cylindrical surface 6 and the outer ring cylindrical surface 8. In this embodiment, the outer ring 7 is an input member, and the inner ring and the shaft 1' are output members.

In this embodiment, when the outer ring 7 is rotated in the direction of the arrow in FIG. 7, the wedge member 10 wedges into between the inner ring cylindrical surface 6 and the outer ring cylindrical surface 8, thereby locking the inner and outer rings together, so that torque is transferred from the outer ring 7 to the output shaft 1' through the wedge member 10 and the inner ring 5. If the outer ring 7 is rotated in the direction opposite to the direction of the arrow in FIG. 7, the wedge member 10 disengages, so that the outer ring 7 is allowed to idle.

In this embodiment, too, when the outer ring 7 rotates in the direction of the arrow in FIG. 7, the wedge member 10 will instantly wedge into between the inner ring cylindrical surface 6 and the outer ring cylindrical surface 8. Also, the surfaces 11 and 12 are brought into surface contact with the surfaces 6 and 8. The surface pressures are thus kept low, so that the one way clutch of this embodiment is durable.

Figure 8:
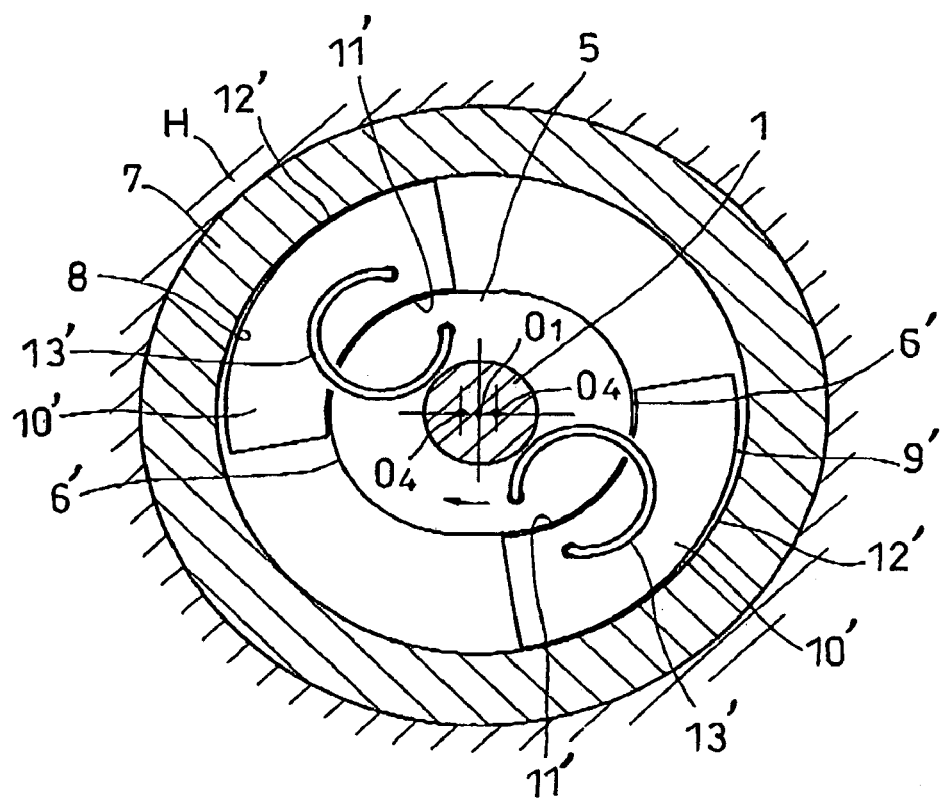

FIG. 8 shows the fourth embodiment, in which the inner ring 5 is mounted on the input shaft 1 so that the inner ring 5 and the input shaft 1 have a common center O1 and are rotatable about this common center. The inner ring 5 is formed with a pair of diametrically opposed, partial cylindrical outer surfaces 6' having centers of curvature O4 that are offset from the center O1. A pair of wedge-shaped spaces 9' are defined between the cylindrical inner surface 8 of the outer ring 7 and the respective partial cylindrical surfaces 6'. Each space 9' has a radially narrowest portion along the line connecting the center of curvature O4 and gradually widens from the narrowest portion toward its circumferential ends.

The wedge member 10 of this embodiment comprises a pair of wedge members 10' each received in one of the wedge-shaped spaces 9', and has a partial cylindrical inner surface 11' which is in sliding contact with the partial cylindrical surface 6', and a partial cylindrical outer surface 12'. The partial cylindrical surfaces 11' and 12' have centers of curvature that are offset from each other such that the wedge members 10' is narrowest in radial width at one end thereof and gradually widens toward the other end. Each wedge member 10' is received in the corresponding space 9' such that its narrow end is disposed in the narrowest portion of the space 9'.

Each wedge member 10' is connected to the inner ring 5 through a resilient member 13' and is biased by the resilient member 13' so as to be wedged into the narrow portion of the wedge-shaped space 9'.

Elements not mentioned above are identical to the corresponding elements of the first embodiment. Thus, such elements are denoted by identical numerals and their description is omitted.

In this embodiment, when the inner ring 5 rotates in the direction of the arrow in FIG. 8 together with the input shaft 1, the wedge members 10' wedge into between the partial cylindrical surfaces 6' of the inner ring 5 and the cylindrical surface 8 of the outer ring 7. Torque is thus transferred from the inner ring 5 to the outer ring 7. If the inner ring 5 is rotated in the opposite direction to the above, the wedge members 10' will disengage, allowing the inner ring 5 to idle.

For the same reasons as set forth in the description of the first to third embodiments, surface pressures are kept low in this embodiment, too, so that the one-way clutch of this embodiment is durable. Further, since the pair of wedge members 10' are arranged symmetrically with respect to the center of rotation of the input shaft 1, the balance in rotation is superior. Thus, the one-way clutch of this embodiment performs well when rotated at a high speed.

In any of the embodiments, the inner ring 5, outer ring 7 and wedge member 10 (or wedge members 10') may be made of a ferrous metal or a sintered material or a synthetic resin having self-lubricity. Otherwise, at least one of the inner ring 5, outer ring 7 and wedge member 10 (or wedge members 10') may be made of a sintered material or a synthetic resin, and the others may be made of a ferrous material.

Both the inner and outer cylindrical surfaces of the wedge member 10 or 10', the inner ring cylindrical surface 6 or 6' and the outer ring cylindrical surface 8 have centers of curvature all located inside of the inner ring 5. This means that the wedge member 10 or 10' is brought into covex-to-cocave contact with both the inner and outer rings. The contact pressures are thus low, which makes it possible to reduce the thickness of the wedge member 10 or 10'. Such a thin wedge member can be formed not only by machining such as turning but also by pressing so that shear surfaces are formed on the engaging surfaces.

If the one-way clutch is used in an environment where it is necessary to transfer large torque, the inner ring 5, outer ring 7, and wedge member 10 (or wedge members 10') should be made of a heat-treated or plated metal. Heat treatment may be total hardening, carburizing or carbonitriding.

If the inner ring 5, outer ring 7 and wedge member 10 (or wedge members 10') are made of a ferrous metal, grease should be retained in the space or spaces defined between the wedge member 10 or wedge members 10' and the outer ring 7 to lubricate the interfaces between the wedge member 10 or wedge members 10' and the inner and outer rings 5 and 7.

In the first to fourth embodiments, the outer ring 7 is fitted on the guide surface 3 of the input shaft 1 so as to be rotatable relative to the input shaft 1. When the wedge member 10 is wedged into between the cylindrical outer surface 6 of the inner ring 5 and the cylindrical inner surface 8 of the outer ring 7, the guide surface 3 is pressed hard against the cylindrical inner surface 8 of the outer ring 7 under the reaction forces to the abovementioned forces in normal directions.

In order to disengage the one-way clutch in this state, torque is applied to the input shaft 1 in a direction to disengage the clutch. This torque has to be relatively large because it has to overcome the slide resistance produced between the guide surface 3 of the input shaft 1 and the cylindrical inner surface 8 of the outer ring 7.

Figure 9:
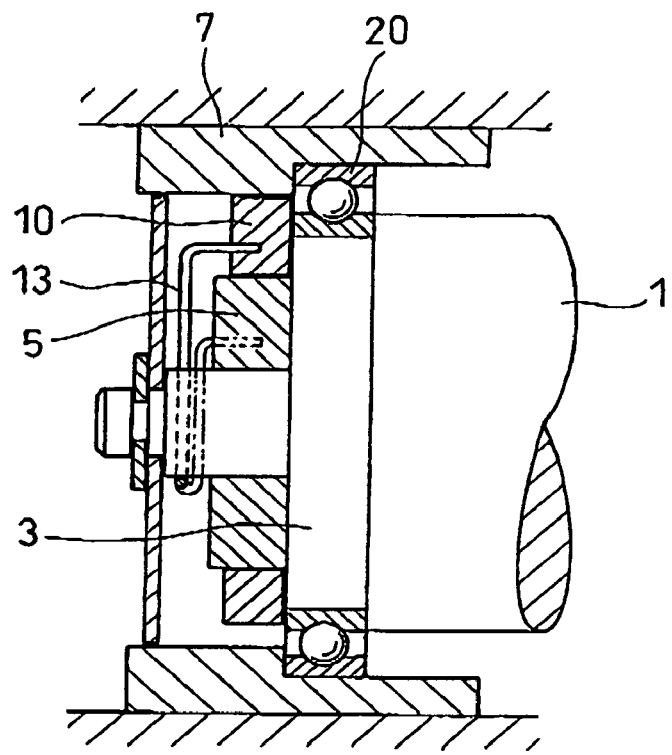
FIGS. 9 to 12 are vertical sectional side views of fifth to eighth embodiments, respectively.

In the fifth embodiment, shown in FIG. 9, in order to reduce this torque, a deep groove ball bearing 20 is mounted between the guide surface 3 of the input shaft 1 and the outer ring 7 so that the input shaft 1 and the outer ring 7 always roll, not slide, on each other. This reduces the torque input to the input shaft 1 necessary to disengage the clutch.

Figure 10:
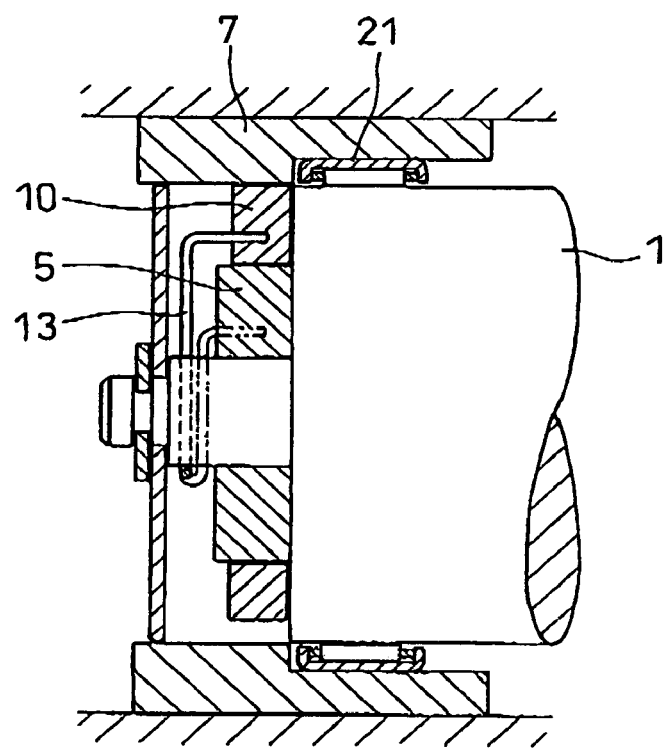

FIG. 10 shows the sixth embodiment, in which a needle bearing 21 is mounted between the input shaft 1 and the outer ring 7 near the end of the input shaft 1 so that the input shaft 1 and the outer ring 7 always roll relative to each other.

Since the needle bearing 21 is greater in the capacity to bear radial loads than the deep groove ball bearing 20 of FIG. 9, the one-way clutch of this embodiment is greater in the rated torque than the clutch of FIG. 9.

Figure 11:
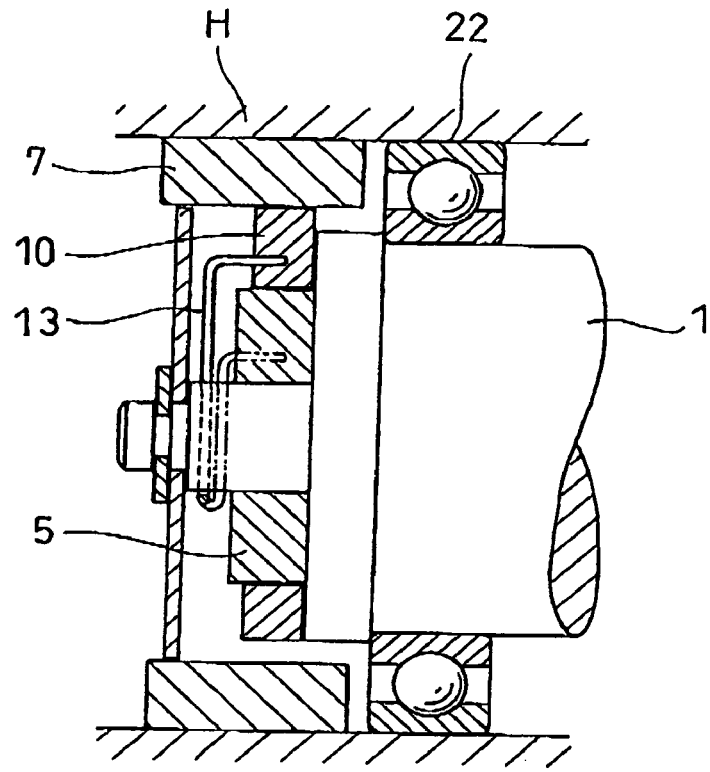
Figure 12:
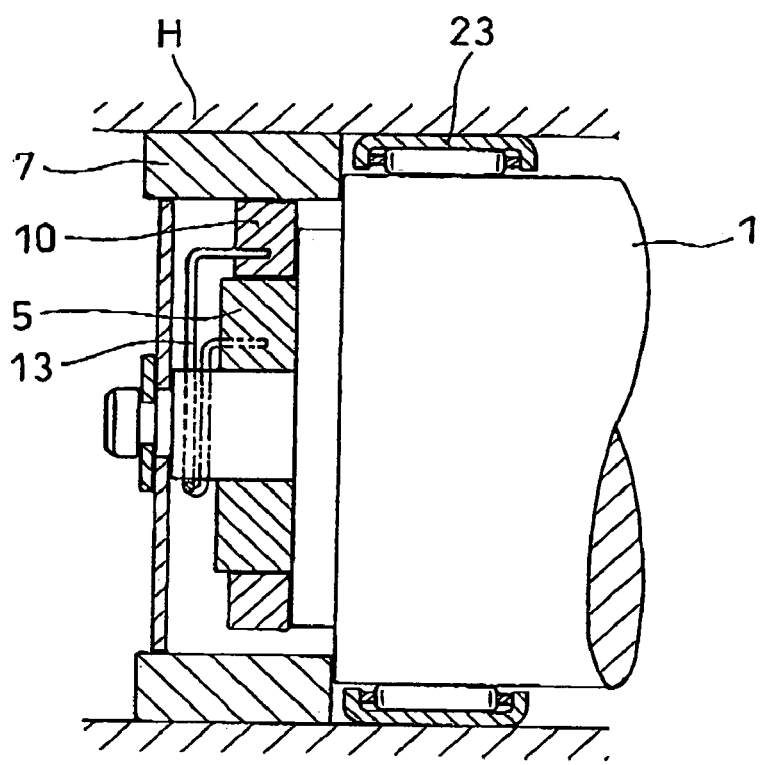

Instead of mounting the deep groove ball bearing 20 (FIG. 9) or needle bearing 7 (FIG. 10) between the input shaft 1 and the outer ring 7, in the seventh embodiment (FIG. 11), a deep groove ball bearing 22 is mounted between the input shaft 2 and the housing, and in the eighth embodiment (FIG. 12), a needle bearing 23 is mounted between the input shaft 1 and the housing H. In either embodiment, it is important to provide a gap between the input shaft 1 and the housing H to keep the input shaft 1 and the outer ring 7 out of contact with each other, thereby minimizing the torque input necessary to disengage the clutch.

Figure 13A:
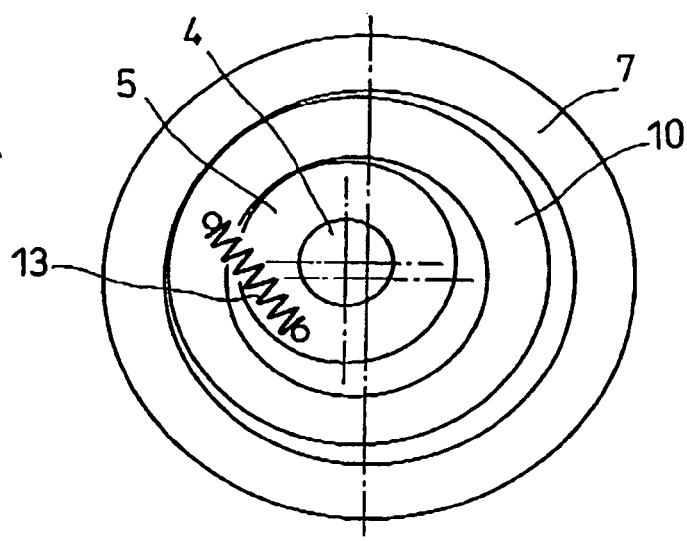
FIGS. 13A to 13C show different resilient members.
Figure 13B:
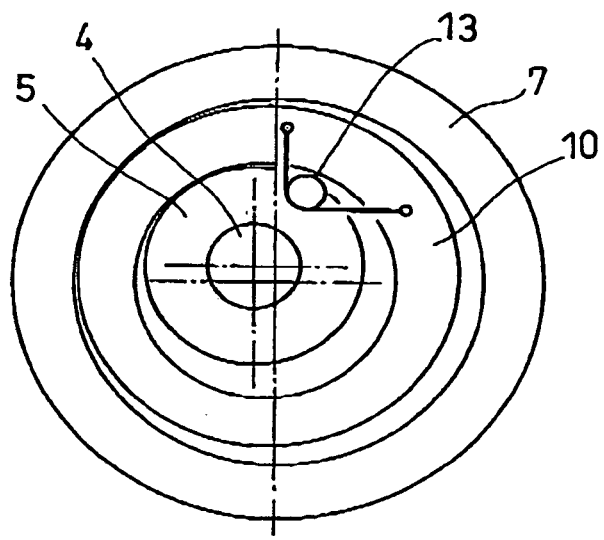
Figure 13C:
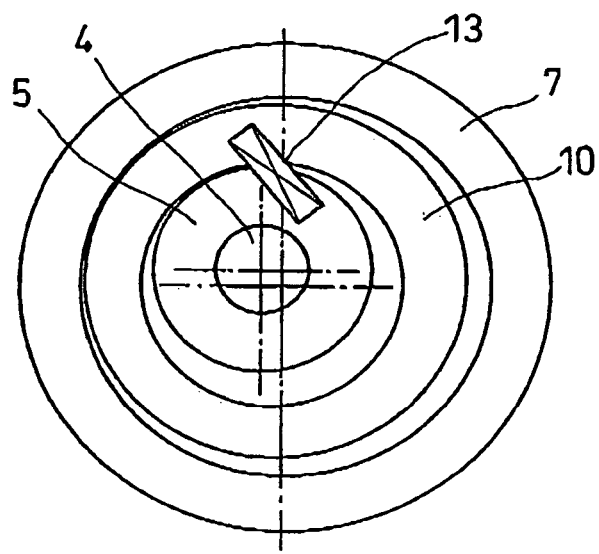

In the first and fourth to eighth embodiments, the resilient member 13 is a C-shaped spring, and in the second and third embodiments, the resilient member 13 is a tensile coil spring. But the resilient member 13 is not limited to a C-shaped spring or a tensile coil spring. For example, it may be a compression coil spring as shown in FIG. 13A, a torsion coil spring as shown in FIG. 13B, or a leaf spring as shown in FIG. 13C.

What is claimed is:

1. A one-way clutch comprising:
   an inner ring having a first cylindrical surface on an outer periphery thereof, said first cylindrical surface having a first center of curvature;
   an outer ring having a second cylindrical surface on an inner periphery thereof so as to radially oppose said first cylindrical surface, said second cylindrical surface having a second center of curvature that is offset from said first center of curvature, said first and second cylindrical surfaces defining a wedge-shaped space therebetween;
   a unitary ring-shaped wedge member disposed in said wedge-shaped space and having a third cylindrical surface on an inner periphery thereof so as to radially oppose said first cylindrical surface, said third cylindrical surface having a third center of curvature, and having a fourth cylindrical surface on an outer periphery thereof so as to radially oppose said second cylindrical surface, said fourth cylindrical surface having a fourth center of curvature that is radially offset from said third center of curvature, whereby said wedge member has a circumferentially changing radial width; and
   a resilient member biasing said wedge member in only one direction to bring said third and fourth cylindrical surfaces into wedging engagement with said first and second cylindrical surfaces, respectively, said resilient member being coupled to said wedge member and one of said inner and outer rings such that said wedge member is biased by said resilient member to rotate in one direction relative to said one of said inner and outer rings, wherein said inner ring, said outer ring, said wedge member and said resilient member are arranged such that said outer ring is unlimitedly rotatable relative to said inner ring when said third and fourth cylindrical surfaces are not in wedging engagement with said first and second cylindrical surfaces, respectively.

2. The one-way clutch of claim 1 wherein said inner ring has a center of rotation that is offset from said first center of curvature and coincides with said second center of curvature.

3. The one-way clutch of claim 1 wherein said inner ring has an outer diameter smaller than the inner diameter of said wedge member.

4. The one-way clutch of claim 1 wherein said inner ring has a center of rotation that coincides with said first center of curvature and is offset from said second center of curvature.

5. The one-way clutch of claim 1 wherein at least one of said inner ring, said outer ring, and said wedge member is made of a pressed metal.

6. The one-way clutch of claim 1 wherein at least one of said inner ring, said outer ring, and said wedge member is made of a sintered material.

7. The one-way clutch of claim 1 wherein at least one of said inner ring, said outer ring, and said wedge member is made of a synthetic resin.

8. The one-way clutch of claim 1 wherein said resilient member is one selected from leaf springs, compression coil springs, tensile coil springs, C-shaped springs and torsion coil springs.

9. The one-way clutch of claim 1 wherein a gap is defined around said wedge member, said gap containing grease.

10. The one-way clutch of claim 1 further comprising a shaft fixed to said inner ring, and a rolling bearing mounted between opposed surfaces of said outer ring and said shaft.

11. The one-way clutch of claim 10 wherein said rolling bearing is one of a deep groove ball bearing and a needle bearing.

12. The one-way clutch of claim 1 further comprising a shaft fixed to said inner ring, a housing supporting said outer ring, and a rolling bearing mounted between opposed surfaces of said housing and said shaft.

13. The one-way clutch of claim 12 wherein said rolling bearing is one of a deep groove ball bearing and a needle bearing.

* * * * *